Jan. 11, 1972   F. H. STEPHENS, JR   3,634,222

SAMPLING AND CONTROL SYSTEM FOR CATHODIC PROTECTION

Filed May 13, 1970

INVENTOR.
FRANK H. STEPHENS, JR.

BY John G. Kovalick

AGENT

United States Patent Office 3,634,222
Patented Jan. 11, 1972

3,634,222
SAMPLING AND CONTROL SYSTEM FOR CATHODIC PROTECTION
Frank H. Stephens, Jr., Morristown, N.J., assignor to Engelhard Minerals and Chemicals Corporation
Filed May 13, 1970, Ser. No. 36,872
Int. Cl. C23f *13/00*
U.S. Cl. 204—196     3 Claims

ABSTRACT OF THE DISCLOSURE

A sampling and control system for cathodic protection of metal immersed in an electrolyte as a cathode, comprising means for automatically making cathodic polarization measurements which are free from anode current induced error voltage and which are used to adjust the system anode current output, the control system having means for periodically interrupting anode current and means for cyclically and periodically sampling cathode reference potential during a time period when the anode current has been interrupted.

BACKGROUND OF THE INVENTION

The potential sensed by a reference electrode at the surface of a cathode immersed in an electrolyte is used as a signal input to a controlled power supply. The input signal causes the controlled power supply to adjust current or voltage fed to an anode so that the reference voltage sensed by the reference electrode approaches the desired potential established as the optimum reference potential. However, the electrical potential which exists between an anode and a cathode establishes a field within the bulk of the electrolyte. Unless the reference electrode is in some manner shielded from this established field, the potential appearing on the reference electrode will not represent the true reference potential of the cathode due to the potential gradient established by the anode current. This offset or error voltage adds to or subtracts from the true reference potential of the cathode surface according to the polarity of the reference electrode. The effect of the offset potential upon a cathodic protection system is a reduction of cathodic polarization proportional to the anode current and a degenerative or negative feedback effect which reduces the amount of current supplied by the system and increases the amount of time required for polarization of the cathode.

In the field of impressed current cathodic protection the application of automatic control has become increasingly wide-spread because of the operational benefits derived by means of automated systems. A manually controlled impressed current cathodic protection system must be closely monitored and adjusted to provide the optimum degree of cathodic polarization in order to insure that neither over-protection or under-protection exists. Over-protection or polarization may result in damage to protective coatings such as paint films and under-protection will, of course, result in unwanted corrosion.

In practice, the degree of cathodic polarization in an impressed current cathodic protection system is monitored by a reference electrode or "half-cell" such as copper-copper sulfate or silver-silver-chloride. This half-cell produces a direct current potential whose magnitude represents the electro-chemical potential difference between the half-cell and the surface being monitored. When the impressed current cathodic protection system shifts the apparent half-cell and cathode potential in the negative direction, the surface being monitored acts as a cathode and said surface is under cathodic protection. The amount of potential shift for optimum protection from corrosion may vary for different materials, however, in practice a shift of 200 millivolts or so is considered adequate.

In an automatically controlled impressed current cathodic protection system the potential sensed by the reference half-cell is used as a control signal to adjust the output of the anode power supply in order to maintain automatically the desired degree of cathodic polarization on the protected surface.

Unfortunately, the potential which appears on the reference electrode does not always accurately represent the true cathode polarization potential. The apparent reference potential consists of four basic components:

(I) The true cathode polarization potential.
(II) Anode current induced electrolyte IR drop.
(III) Cathode-electrolyte interface IR drop.
(IV) Stored charge in the cathode dielectric coating.

Components II, III, and IV are undesirable and are of such a polarity that they add to the true cathode polarization potential indicating a higher degree of polarization than actually exists. Under certain conditions, the magnitude of these potentials is sufficiently large to seriously interfere with the effectiveness of an automatically controlled impressed current cathodic protection system. These anode current induced errors are not constant. They vary as a function of anode current, electrolyte conductivity, reference electrode placement and the condition of the protective coating on the cathode surface.

Performance can be improved by optimizing the placement of the reference half-cell. This is usually done in the case of boats and ships by the use of a special shielded reference electrode assembly which is mounted in the plane of the vessel's hull thereby minimizing intercepted electrolyte IR drop. Low electrolyte conductivity aggravates the situation because of increased IR drop in the bulk of the electrolyte. Because of these anode current induced errors in apparent reference half-cell potentials it is sometimes difficult to make accurate cathodic polarization potential readings. In making cathodic potential surveys, corrosion engineers often resort to a procedure which minimizes the errors caused by the flow of anode current through the electrolyte. This procedure is called the "Instant Off" Method and is so named because the engineer makes his reference half-cell potential reading immediately after he interrupts the flow of system anode current. The anode IR drop induced error components (II and III) immediately drop to zero, the stored charge (IV) in the cathode dielectric coating discharges exponentially to the cathode and some depolarization of the cathode occurs by the time the engineer's monitoring meter movement ballistically settles, but the meter indication is much closer to the true cathodic polarization level than when the anode current was on. The sampling system according to the invention automates as a control mode the instant-off principle of measurement by cyclically or periodically interrupting system anode current for a short period of time during which system reference half-cell potential is measured or sampled and stored in a memory circuit. This stored reference potential information is then used as an error signal to provide a correcting signal to the anode current control circuit.

The object of the invention contemplates to obviate the effects of the offset potential so that the cathode reference potential during the system operation can be accurately determined from a practical reference cell, and precise control of cathode polarization can be achieved in an automatically controlled system.

SUMMARY OF THE INVENTION

In accordance with the invention there is provided a sampling and control system for cathodic protection of metal immersed in an electrolyte as a cathode, comprising means for automatically making cathodic polarization measurements which are free from anode current induced error voltage and which are used to adjust the system anode current output, the control system having means for periodically interrupting anode current and means for cyclically and periodically sampling cathode reference potential during a time period when the anode current has been interrupted. Basically, the sampling system eliminates error voltage or offset potential by eliminating or turning off the causative agent for its generation, i.e. the system anode current. This is done repetitively in a cyclic manner for short periods of time during which the cathode polarization potential is determined. The potential thus measured is stored and its amplitude compared with a standard potential representing the desired cathodic surface polarization potential. The difference between these two potentials represents an error signal which is fed into a control system to adjust the average value of the anode current in the direction required to reduce the error signal thereby causing the actual cathodic polarization potential to approach the desired value.

DESCRIPTION OF THE PREFERRED EMBODIMENTS

Figure 1:
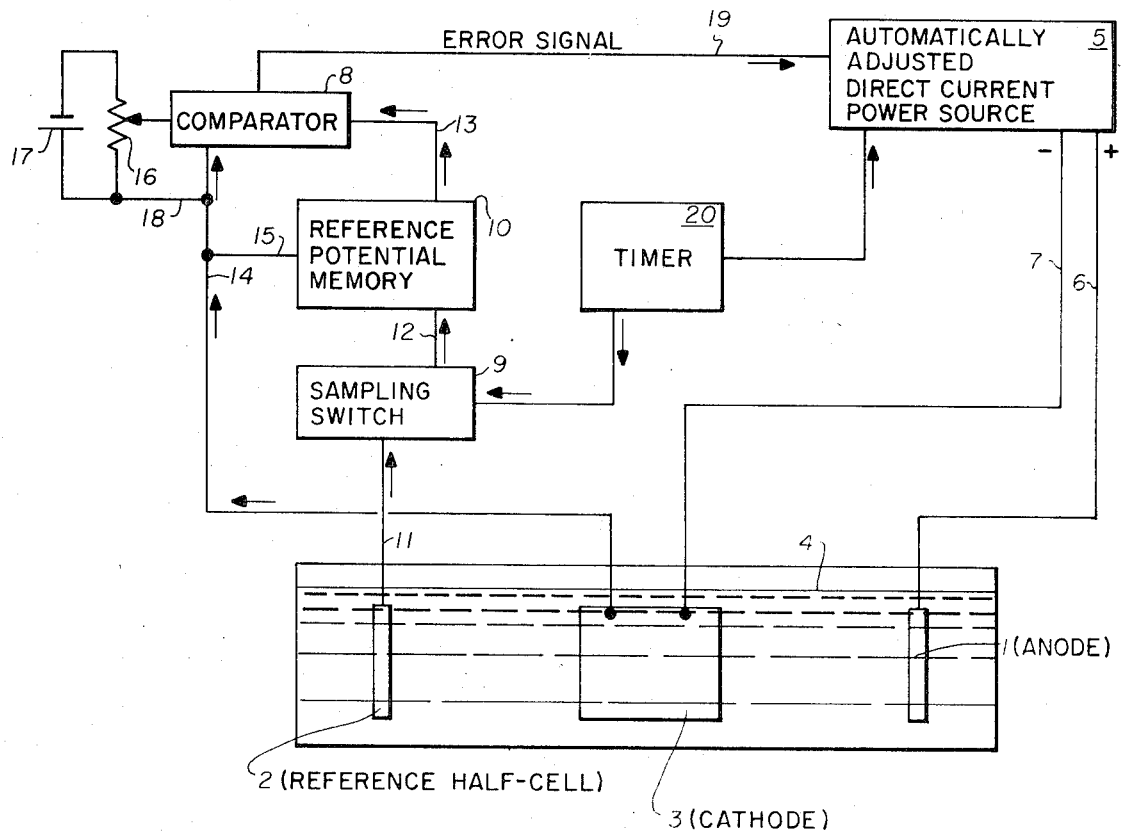
FIG. 1 illustrates a schematic view of the sampling and control system of the invention.

Referring to FIG. 1, the sampling and control system of the invention comprises an anode 1, a reference electrode 2 and a surface to be cathodically protected as a cathode 3 all immersed in an electrolyte 4. The system further comprises a direct current source of power 5 with a positive lead 6 electrically connected from the power source to the anode 1 and a negative lead 7 electrically connected from the power source to the cathode 3.

The reference electrode 2 is electrically associated, e.g. electrically connected, to a comparator 8 through an electrical path means comprising a sampling switch 9 and a reference potential memory device 10. The memory device operates to store or memorize the potential generated by the reference electrode 2 in combination with cathode surface 3. Lead 11 connects the reference electrode 2 to the sampling switch 9 and lead 12 connects the sampling switch to the memory device while lead 13 leads from the memory device 10 to the comparator 8. The memory device is a capacitor type device and is connected to a ground lead 14, connected between the comparator and the cathode 2, by means of conductor 15.

A predetermined potential for optimum cathodic protection (e.g. a potential of 0.85 volt) is fed into comparator 8. The predetermined potential is provided by a voltage divider 16 connected across the poles of a direct current source 17 and grounded to the ground conductor 14 by means of conductor 18. The potential sensed by the reference half-cell 2 is compared against the pre-set standard reference potential thus generating an error signal representative of the difference between the existing cathodic polarization level obtained from the memory device 10 and the desired pre-set potential fed into comparator 8 by means of the circuit components 16 and 17. The error signal is used as a controlling signal to automatically adjust the flow of direct current power to the system anode. The error signal is fed from comparator 8 to the power source 5 by electrical signal conducting means 19. A cyclic timer 20, e.g. a clock, is connected to the direct current power source 5 and also to the sampling switch 9. When the system is in operation, the timer 20 controls the function of the power source 5 and the switch 9 in a sequence such as illustrated by FIG. 2 and such that at no time is the sampling switch closed when the anode 1 is being energized from source 5.

Figure 2:
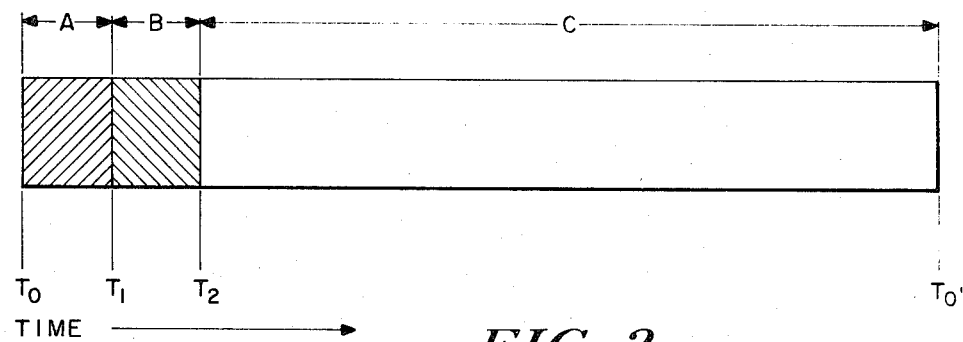
FIG. 2 is a graphic representation of a typical sampling and control time cycle.

FIG. 2 shows graphically a typical sampling and control time cycle representing the sequential operation of the sampling and control functions. The cycle begins at time $T_0$. At this time system anode current is turned off by means of timer 20. The time period A ($T_0$–$T_1$) represents a delay period before sampling period B ($T_1$–$T_2$) takes place. This delay period may have a time dimension between zero and 0.2 second. Its purpose is to permit the decay of anode current-induced cathode coating dielectric charge (error component IV). Time B ($T_1$–$T_2$) represents the reference potential sampling period during which the reference half-cell 2 is electronically switched, by means of sampling switch 9, to the reference potential memory device 10. Note that no anode current flows during A or B. Period B is of sufficient length to permit the potential appearing at the reference electrode 2 to equalize the charge in the memory device 10. A typical sampling period may be from about 1.0 to about 10.0 milliseconds in length. The period C ($T_2$–$T_0'$) is the control or "anode on" period. It is during this time that current is supplied to the system anode 1, said current being regulated by the controller as previously described. At the end of period C at $T_0'$, the anode current is again interrupted and the entire sampling time cycle is repeated. This sequence is continuously repeated during the time that the sampling and controlling system is in operation.

Since the timer 20 controls the function of the power source 5 and the switch 9 in a sequence such as illustrated by FIG. 2, it is apparent that the timer 20 has distinct sequential timing periods consisting of an anode 1 deactivating delay period, a switch 9 and memory device 10 activating period and a power source 5 activating period.

Various modifications are contemplated within the scope of the appended claims.

I claim:

1. A sampling and control system for cathodic protection of metals immersed in an electrolyte, comprising an anode, a metal to be cathodically protected as a cathode, and a reference electrode, adjustable electrical means for adjustably electrically energizing the anode, means for providing a predetermined cathodic protection potential, comparator means responsive to the predetermined potential means, the comparator means being electrically connected to the cathode, electrical path means communicating between the reference electrode and the comparator means whereby the comparator means is also responsive to the reference electrode potential, a cyclic timer means connected to alternately activate one of the path means and the adjustable electrical means, the cyclic timer means having distinct sequential timing periods consisting of an anode deactivating delay period, an electrical path means activating period and an adjustable electrical means activating period, and means for transmitting a resultant signal from the comparator means to the adjustable electrical means.

2. A sampling and control system according to claim 1, wherein the electrical path means comprises a switch means and a reference potential memory device in electrical series.

3. A sampling and control system according to claim 2, wherein the switch means is responsive to the timer means.

References Cited

UNITED STATES PATENTS

| 2,759,887 | 8/1956 | Miles | 204—196 |
| 3,129,154 | 4/1964 | Fry | 204—196 |

TA-HSUNG TUNG, Primary Examiner

U.S. Cl. X.R.

204—147